United States Patent [19]

Oskam et al.

[11] Patent Number: 4,895,337
[45] Date of Patent: Jan. 23, 1990

[54] ADJUSTING INSTRUMENT FOR ELECTRICALLY ADJUSTING THE INTERIOR MIRROR OF A MOTOR VEHICLE ABOUT TWO MUTUALLY PERPENDICULAR AXES

[75] Inventors: Aane A. Oskam, De Meern; Hermanus M. I. Koot, Montfoort, both of Netherlands

[73] Assignee: IKU Holding Montfoort B.V., Montfoort, Netherlands

[21] Appl. No.: 180,782

[22] Filed: Apr. 12, 1988

[30] Foreign Application Priority Data

Apr. 14, 1987 [NL] Netherlands ................. 8700878

[51] Int. Cl.$^4$ ............................................. G02B 7/18
[52] U.S. Cl. ..................................... 248/487; 350/636
[58] Field of Search ............... 248/476, 479, 487, 495; 350/632, 633, 634, 636, 637

[56] References Cited

U.S. PATENT DOCUMENTS

| | | | |
|---|---|---|---|
| 3,628,862 | 12/1971 | Stephenson | 248/487 |
| 3,972,597 | 8/1976 | Repay | 350/634 |
| 4,050,776 | 9/1977 | Hsu | 350/636 |
| 4,101,206 | 7/1978 | Oskam | 350/636 |
| 4,114,988 | 9/1978 | Enomoto | 350/634 |
| 4,153,342 | 5/1979 | Mittelhauser | 350/633 |
| 4,286,841 | 9/1981 | Deshaw | 350/636 |
| 4,632,525 | 12/1986 | Hayashi | 350/637 |
| 4,750,486 | 6/1988 | Butler | 350/636 |

FOREIGN PATENT DOCUMENTS

| | | | |
|---|---|---|---|
| 1266159 | 4/1968 | Fed. Rep. of Germany | 350/636 |
| 2810888 | 9/1979 | Fed. Rep. of Germany | 350/636 |
| 2454933 | 12/1980 | France | 350/636 |
| 2454935 | 12/1980 | France | 350/634 |
| 2011846 | 7/1979 | United Kingdom | 350/636 |

Primary Examiner—Ramon O. Ramirez
Assistant Examiner—Robert A. Olson
Attorney, Agent, or Firm—Wenderoth, Lind & Ponack

[57] ABSTRACT

An adjusting instrument for electrically adjusting the interior mirror of a motor vehicle about two mutually perpendicular axes. The device comprises a vehicle-connectable suspension device and a mirror mounting plate connected thereto. The plate is adjustable about two mutually perpendicular axes and supports a rear-view mirror. The suspension device comprises a housing accommodating two drive units whose output shafts are perpendicular to one another and geared to drive the mirror mounting plate. The drive units are arranged to exert a torque on the point of suspension of the suspension device, that is equal but opposite to the torque exerted on the point of suspension by the mirror mounting plate and mirror.

6 Claims, 2 Drawing Sheets

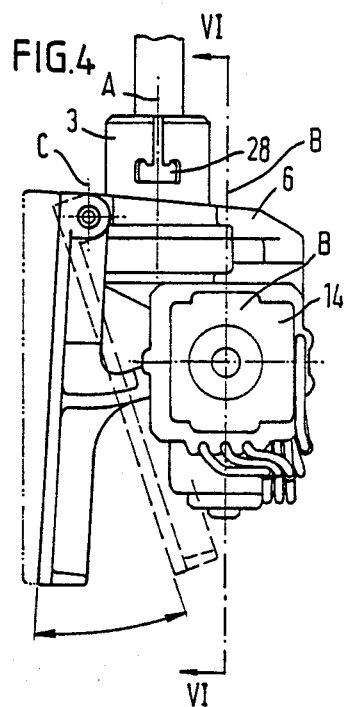
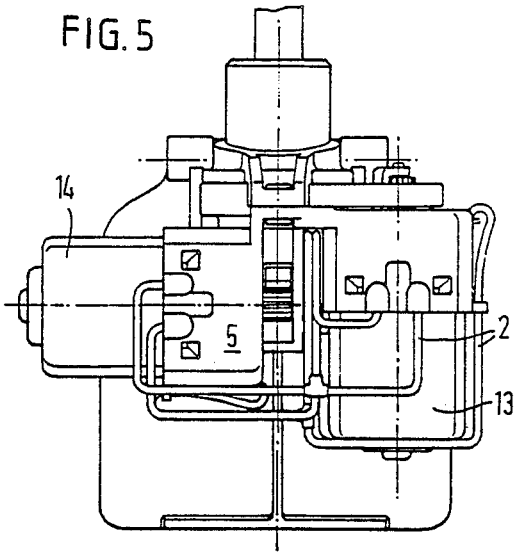
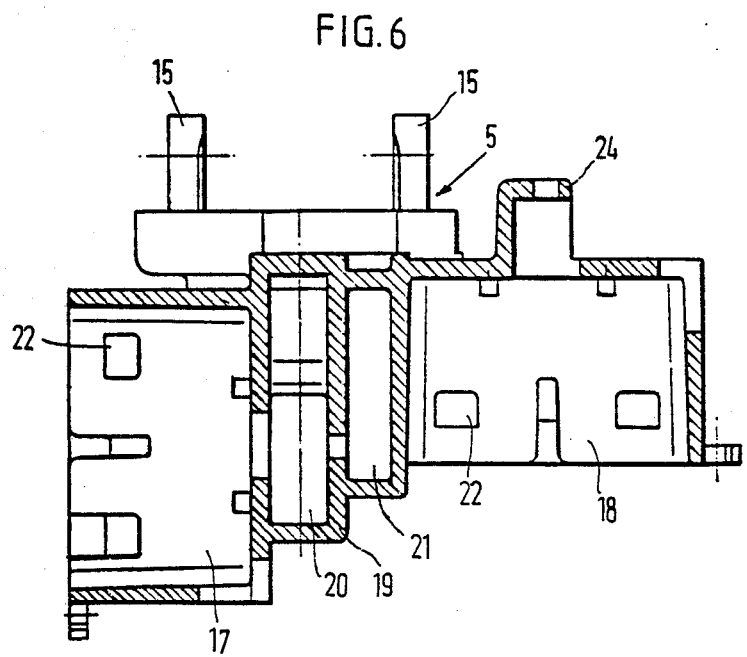

ADJUSTING INSTRUMENT FOR ELECTRICALLY ADJUSTING THE INTERIOR MIRROR OF A MOTOR VEHICLE ABOUT TWO MUTUALLY PERPENDICULAR AXES

BACKGROUND OF THE INVENTION

This invention relates to an adjusting instrument for electrically adjusting the interior mirror of a motor vehicle about two mutually perpendicular axes, said instrument comprising:

(1) a vehicle-connectable suspension device for a mirror mounting plate and (2) a mirror mounting plate connected thereto and adjustable about two mutually perpendicular axes, said plate supporting a rearview mirror.

The interior mirrors known at the present time comprise a mirror mounting plate on whose rear side there is provided a suspension device, which together with a ball fixedly connected to the vehicle, forms a universal pivot joint. The suspension device is fixedly clamped onto said ball, so that a high degree of friction is produced between the suspension device and the ball, ensuring that the interior mirror is suspended vibrationless. Naturally, this high friction also entails strong adjusting forces. Since the interior mirror is adjusted manually, this is not a drawback. Relatively strong forces can be exerted during manual adjustment.

It is becoming more and more standard practice to provide the side mirrors of a motor vehicle with an electric adjusting instrument, especially since the outside mirrors are difficult to reach by the driver. The adjusting instrument for outside mirrors can be secured in a mirror housing provided on either side of the motor vehicle. Advantageously, electrically adjustable side mirrors have the possibility of being brought to a number of pre-programmed positions, adjusted to the size, or the posture behind the wheel of different drivers of one and the same motor vehicle.

It is desirable for interior mirrors as well to be placed in some pre-programmed positions, which requires an electrical adjusting instrument. The adjusting instruments used for outside mirrors cannot be used for this purpose, since interior mirros do not have a housing in which an adjusting device can be mounted. The adjusting instrument should, moreover, have a very compact form, since it must not project outside the mirror, and in particular, vertically. The adjusting forces for the mirror to be generated by adjusting motors are considerably weaker than adjusting forces that can be exerted manually on the mirror, so that a low-friction suspension structure has to be chosen. Reduction of the friction in the suspension structure considerably increases the chance of inconvenient vibrations of the interior mirror.

SUMMARY OF THE INVENTION

It is an object of the present invention to provide an adjusting instrument for an interior mirror of the above described type which has a compact structure, is adjustable by weak adjusting forces, and can nevertheless be suspended in a motor vehicle in a vibrationless manner. The adjusting instrument according to the present invention is characterized to that end in that the suspension device comprises a housing accommodating two drive units having output shafts which extend normal to one another, as well as a mirror mounting plate connected to said housing for pivotal movement about a horizontal shaft and adjustable by the drive units, said drive units being disposed at such an interval from the point of suspension of the suspension device that the torque exerted thereby on said point of suspension is equal but opposite to the torque exerted on the point of suspension by the mirror mounting plate and mirror.

The heaviest part of a mirror adjusting instrument with a mirror mounted thereon is the mirror blade, whose weight is in the order of 180 g. The drive units are considerably lighter, their weight is about 60 g each. By supporting the mirror with an associated mirror carrier plate, on the one hand, and the drive units, on the other, at appropriate distances from the point of suspension, a statically balanced arrangement, can be obtained which does not act as a source of vibration. Naturally, the interconnections of the parts should be designed free from play in such a manner that these too, are not conducive to the production of vibrations.

For facilitating adjustment of the mirror mounting plate, the plate is provided on its rear side with a toothed arcuate segment which is in engagement with a pinion disposed on the drive unit having a horizontal shaft.

The mirror mounting plate can be swivelled about a horizontal axis by means of the toothed arcuate segment, the pinion of the drive unit being permanently in engagement with the toothed segment. The mirror mounting plate is thus maintained in a given angular position by the stationary drive unit.

For the purpose of swivelling the mirror mounting plate about a vertical axis, the suspension device comprises a suspension member fixedly connectable to the motor vehicle, said member being connected to the housing through a retaining clamp. The housing is rotatable about the suspension member, which is provided with a toothed arcuate segment lying in a horizontal plane. The segment being in engagement with a pinion disposed on the drive unit having a vertical shaft.

When the drive unit having a vertical shaft is energized, the housing with the drive units incorporated therein, as well as the mirror plate connected to said housing, will be bodily rotated relative to the suspension member fixedly connected to the motor vehicle.

The connection of said suspension member to the motor vehicle is effected by a bayonet coupling, for which purpose the suspension member is provided with two diametrically opposite recesses.

BRIEF DESCRIPTION OF THE DRAWINGS

One embodiment of the adjusting instrument according to the present invention will now be described, by way of example, with reference to the accompanying drawings, in which:

FIG. 4 is a side view thereof;

FIG. 5 is a rear view of the adjusting instrument;

FIG. 6 is a cross-sectional view of the housing of the suspension device of the adjusting instrument taken along line VI—VI of FIG. 4.

DETAILED DESCRIPTION OF THE PREFERRED EMBODIMENT

Figure 2:
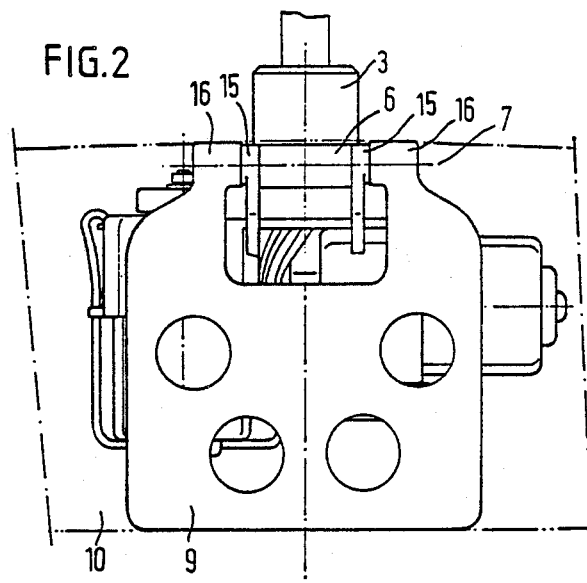
FIG. 2 is a front view thereof.
Figure 3:
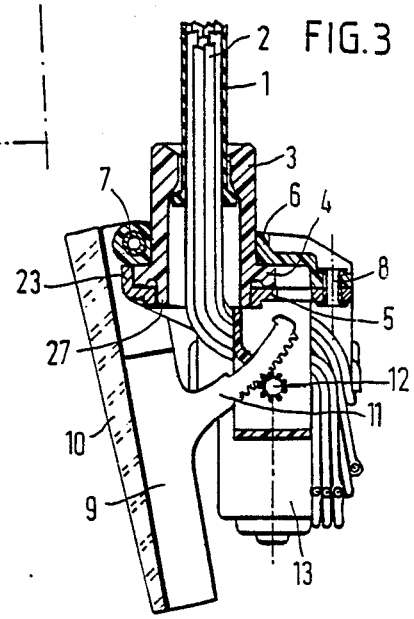
FIG. 3 is a cross-sectional view thereof taken along line III—III of FIG. 1.

The structure of the adjusting instrument is best shown in FIG. 3. The instrument is connected to the motor vehicle through a suspension member 3, which is designed to be connectable to the motor vehicle so as to be fixed both in rotational and in axial directions; e.g. to the ceiling of the vehicle roof. To that end, the wall of suspension member 3 has two diametrically opposite recesses 28 (see FIG. 4), by means of which suspension member 3 is connectable to the motor vehicle through a bayonet coupling. Suspension member 3 is substantially cylindrical and internally hollow, so as to allow the passage of the electrical wiring 2 to the drive motors via the suspension member. Wiring 2 is surrounded by a protective cable 1. Suspension member 3 is provided at its bottom with a flange 4, whose surface rests on a socket 23 provided on the top of housing 5. Provided outside flange 4 of suspension member 3 is a projecting edge 27, designed to fit and guide socket 23 in a corresponding recess thereof. The connection between suspension member 3 and housing 5 is obtained by a retaining clamp 6, which is pushed over suspension member 3 and abuts the upper edge of flange 4. Said retaining clamp 6 is connected on one side to the top face of housing 5 through a rivet 8, while on the opposite side, there is provided a horizontal pin 7, which projects through two eyes 15 (FIG. 2), projecting above socket 23 of housing 5. Pin 7 projects also through a hole provided in retaining clamp 6. Retaining clamp 6 and housing 5 are rotatable about suspension member 3, while respectively abutting the opposite horizontal edges of flange 4.

Figure 1:
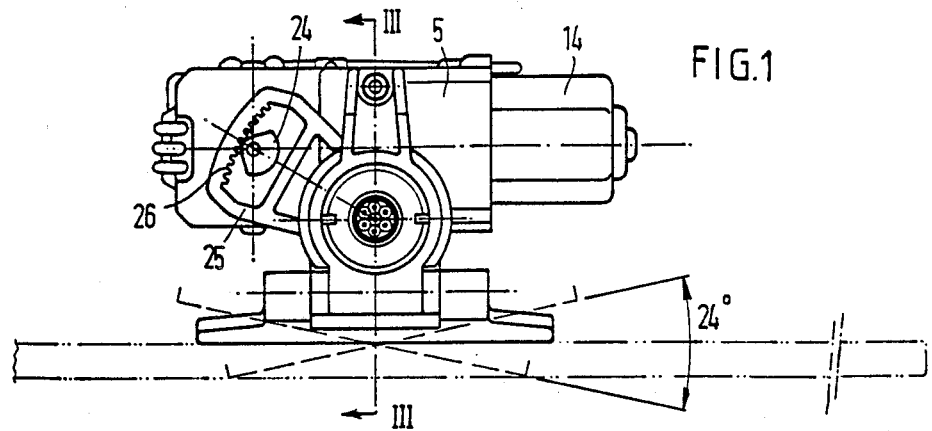
FIG. 1 is a top view of the adjusting instrument according to the present invention.

The mirror mounting plate 9 is provided on its upper edge with two eyes 16 (FIG. 2), adapted to be pivotally connected by means of pin 7 to the suspension device, consisting of suspension member 3, housing 5 and retaining clamp 6. Mounted on mirror mounting plate 9 is a mirror 10, e.g. by means of gluing. On the rear side of the mirror mounting plate 9, there is provided a toothed arcuate segment 11 whose teeth are in engagement with a pinion 12 integral with a horizontal shaft of a drive unit 14 which, in FIG. 3, lies in front of the plane of drawing. By energizing the motor of the drive unit 14, mirror 9,10 can be swivelled about pin 7 in two directions through a range of adjustment of 22°, as shown in FIG. 4. The horizontal adjustability is 24°, as indicated in the top view of FIG. 1. The horizontal adjustment of the mirror can be obtained by energizing the motor of the drive unit 13 having a vertical output shaft. The output shaft of drive unit 13 is also provided with a pinion, which is in engagement with teeth 26 provided on an arcuate member 25 connected to flange 4 of suspension member 3 (FIG. 1). Because suspension member 3 is fixedly connected to the motor vehicle, upon energization of the motor of drive unit 13, the associated pinion will be displaced over the teeth 26 of arcuate member 25, so that housing 5 with the mirror 9,10 suspended therefrom is rotated about a vertical axis.

Housing 5 is best shown in FIG. 6. The housing comprises two chambers having rectangular walls 17,18 for receiving therein drive unit 14 having a horizontal shaft and drive unit 13 having a vertical shaft, respectively. Drive units 13,14 are of the type described in Dutch patent application No. 84,01140, which is hereby for incorporated by reference. The walls of chambers 17,18 contain recesses 22. Drive units 13,14 are provided exteriorly with projections that are adapted to snap into recesses 22.

Chambers 17,18 are interconnected by a compound connecting wall 19 wherein two chambers 20,21 are defined. Chamber 20 serves for accommodating the toothed arcuate segment 11, mounted on the rear side of the mirror mounting plate 9. Chamber 21 serves for accommodating the electrical wiring 2 exiting from the ceiling of the vehicle through the housing; the ends of said wiring have to be connected to drive units 13,14 as shown in FIG. 5. Above the top wall of the motor compartment 18, there is provided a cap 24 for receiving the pinion, which is pushed onto the output shaft of drive unit 13. This pinion is in engagement with the teeth 26 of arcuate member 25 (FIG. 1).

At the top of the housing, there is provided the socket 23 for receiving the flange 4 of suspension member 3, as shown in cross-section in FIG. 3. Above the socket two spaced eyes 15 project, between which the bored portion of retaining clamp 6 can be placed. Afterwards, these eyes 15 and the retaining clamp 6 can be coupled to the horizontal pin 7.

In FIG. 4 A indicates the axis of suspension member 3. B indicates the plane containing the axes of drive units 13,14. The weight of mirror mounting plate 9 with mirror 10 mounted thereon acts on pin 7, while C indicates a vertical plane containing the axis of pin 7. The distances between planes A and C on the one hand and between planes B and A on the other hand are chosen in such a manner that the parts situated to the left and to the right of plane A exert an equally large but opposite torque on the point of suspension situated on the line A. As a result, the instrument is balanced, thereby obviating a source of potential vibrations.

We claim:

1. Electrically adjustable interior mirror structure of a motor vehicle, said structure comprising:
    a suspension device suspendable at a point of suspension from a motor vehicle interior, said suspension device including a housing;
    a mirror mounting plate connected to said suspension device and adjustable about two mutually perpendicular axes;
    a mirror mounted to said plate; and
    two electrically operable drive units accommodated in said housing, said drive units having respective output shafts extending perpendicular to one another and connected to said mirror mounting plate for adjusting said mirror mounting plate about said axes thereof, respectively,
    said drive units and said mirror mounting plate having the mirror mounted thereto being so disposed relative to the point of suspension of said suspension device that when the suspension device is suspended, the torque exerted by said drive units at the point of suspension is equal but opposite to the torque exerted at the point of suspension by said mirror mounting plate and said mirror.

2. Electrically adjustable interior mirror structure as claimed in claim 1,
    wherein a first one of said drive units has a pinion integral with the drive shaft thereof, the drive shaft of said first one of said drive units extending horizontally when the suspension device is suspended, and said mirror mounting plate has a front side to which said mirror is mounted and a rear side having a toothed arcuate segment engaging said pinion.

3. Electrically adjustable interior mirror structure as claimed in claim 1,
wherein said suspension device comprises a suspension member fixedly connectable to the motor vehicle interior, and a retaining clamp connected to said housing and said suspension member for rotatably mounting said housing to said suspension member, said suspension member including a toothed arcuate segment lying in a horizontal plane when the suspension device is suspended, and wherein a second one of said drive units has a pinion integral with the drive shaft thereof and engaging said toothed arcuate segment of said suspension member, the drive shaft of said second one of said drive units extending vertically when the suspension device is suspended.

4. Electrically adjustable interior mirror structure as claimed in claim 2,
wherein said suspension device comprises a suspension member fixedly connectable to the motor vehicle interior, and a retaining clamp connected to said housing and said suspension member for rotatably mounting said housing to said suspension member, said suspension member including a toothed arcuate segment lying in a horizontal plane when the suspension device is suspended, and wherein a second one of said drive units has a pinion integral with the drive shaft thereof and engaging said toothed arcuate segment of said suspension member, the drive shaft of said second one of said drive units extending vertically when the suspension device is suspended.

5. Electrically adjustable interior mirror structure as claimed in claim 3,
wherein said suspension device has two diametrically opposite recesses extending therein capable of serving as a portion of a bayonet coupling.

6. Electrically adjustable interior mirror structure as claimed in claim 4,
wherein said suspension device has two diametrically opposite recesses extending therein capable of serving as a portion of a bayonet coupling.

* * * * *